United States Patent
Stoyanov

(10) Patent No.: US 8,499,059 B2
(45) Date of Patent: Jul. 30, 2013

(54) SYSTEM AND METHODS FOR BUFFERING OF REAL-TIME DATA STREAMS

(75) Inventor: Latchesar Stoyanov, Sunnyvale, CA (US)

(73) Assignee: Rovi Solutions Corporation, Santa Clara, CA (US)

( * ) Notice: Subject to any disclaimer, the term of this patent is extended or adjusted under 35 U.S.C. 154(b) by 0 days.

(21) Appl. No.: 12/387,511

(22) Filed: May 4, 2009

(65) Prior Publication Data

US 2010/0281142 A1    Nov. 4, 2010

(51) Int. Cl.
*G06F 15/173* (2006.01)

(52) U.S. Cl.
USPC ............................ 709/220; 709/231; 709/232

(58) Field of Classification Search
None
See application file for complete search history.

(56) References Cited

U.S. PATENT DOCUMENTS

| | | | |
|---|---|---|---|
| 5,619,337 A | | 4/1997 | Naimpally |
| 5,822,537 A * | | 10/1998 | Katseff et al. ................. 709/231 |
| 5,881,245 A | | 3/1999 | Thompson |
| 6,665,751 B1 * | | 12/2003 | Chen et al. ....................... 710/52 |
| 2002/0120747 A1 | | 8/2002 | Frerichs et al. |
| 2003/0067872 A1 | | 4/2003 | Harrell et al. |
| 2005/0076136 A1 * | | 4/2005 | Cho et al. ....................... 709/231 |
| 2006/0165166 A1 * | | 7/2006 | Chou et al. ................ 375/240.05 |
| 2007/0118618 A1 * | | 5/2007 | Kisel et al. ..................... 709/219 |
| 2009/0182889 A1 * | | 7/2009 | Hurst et al. .................... 709/231 |
| 2010/0121977 A1 * | | 5/2010 | Kontola et al. ................ 709/232 |

FOREIGN PATENT DOCUMENTS

WO    WO-2008084179 A1    7/2008

OTHER PUBLICATIONS

"International Application Serial No. PCT/US2010/033264, Written Opinion mailed Aug. 24, 2010", 6 pgs.
"International Application Serial No. PCT/US2010/033264, Search Report mailed Aug. 24, 2010", 4 pgs.

* cited by examiner

*Primary Examiner* — Ario Etienne
*Assistant Examiner* — Clayton R Williams
(74) *Attorney, Agent, or Firm* — Ropes & Gray LLP

(57) ABSTRACT

A computer-implemented system and methods for buffering of real-time data streams are disclosed. The apparatus and method in an example embodiment includes: configuring a content server for an initial content quality type associated with a content stream; receiving the content stream with the initial content quality type from a content feed; detecting a low watermark condition as the content stream is played on a playback device; reconfiguring the content server for a modified content quality type associated with the content stream while receipt of the content stream is in progress; and receiving the content stream with the modified content quality type from the content feed.

11 Claims, 8 Drawing Sheets

SYSTEM AND METHODS FOR BUFFERING OF REAL-TIME DATA STREAMS

COPYRIGHT NOTICE

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2008-2009, Macrovision Solutions Corporation, All Rights Reserved.

BACKGROUND

1. Technical Field

This disclosure relates to networked systems. More particularly, the present disclosure relates to buffering of real-time data streams.

2. Related Art

In conventional network-based streaming content delivery systems, it is a challenge to maintain a constant playback rate for the streamed content at a client playback device when the network transmission of the content is subject to unpredictable and erratic delays. Though some existing systems attempt to slow the data rate at the server, these solutions still tend to produce erratic streams and increased network traffic. Further, the content feeds that provide the data streams may not be controllable by a client playback device.

Thus, a computer-implemented system and methods for buffering of real-time data streams is needed.

BRIEF DESCRIPTION OF THE DRAWINGS

Embodiments illustrated by way of example and not limitation in the figures of the accompanying drawings, in which.

DETAILED DESCRIPTION

A computer-implemented system and methods for buffering of real-time data streams are disclosed. In the following description, numerous specific details are set forth. However, it is understood that embodiments may be practiced without these specific details. In other instances, well-known processes, structures and techniques have not been shown in detail in order not to obscure the clarity of this description. Various embodiments are described below in connection with the figures provided herein.

United States Patent Publication No. US 2002/0120747 discloses a system and method for buffering streaming audio data or other media sources to client devices, where said system maintains a constant buffering time by adjusting the low water mark of the play buffer based on the bit rate of the stream to a level such that the time for the play buffer to fill to the low water mark is constant for all streams.

U.S. Pat. No. 5,881,245 discloses a method and device for communicating encoded data (such as MPEG encoded data for example) from a server to a decoder via a buffer. The rate at which the server provides the encoded data are adjusted based on a state of the buffer such that the buffer does not overflow or run dry, even when the communication of the data is subject to drift. Specifically, when the buffer is below a predetermined level, the rate at which the server provides the encoded data is increased. On the other hand, when the buffer is above a predetermined level, the rate at which the server provides the encoded data is decreased.

U.S. Pat. No. 5,619,337 discloses a system to record a single program from a multi-program transport stream that is encoded according to the MPEG-2 standard. The system demultiplexes transport packets from the multi-program transport stream and records the demultiplexed packets on a digital video cassette recorder (DVCR). The system includes circuitry in the encoder which emulates a buffer in the digital recorder that is used to hold the packets to convert the bursty packet data into constant rate data for recording. This emulated buffer controls the overall rate at which packets of the selected program are inserted into the multi-program transport stream by the encoder.

Overview of Various Embodiments

Figure 1:
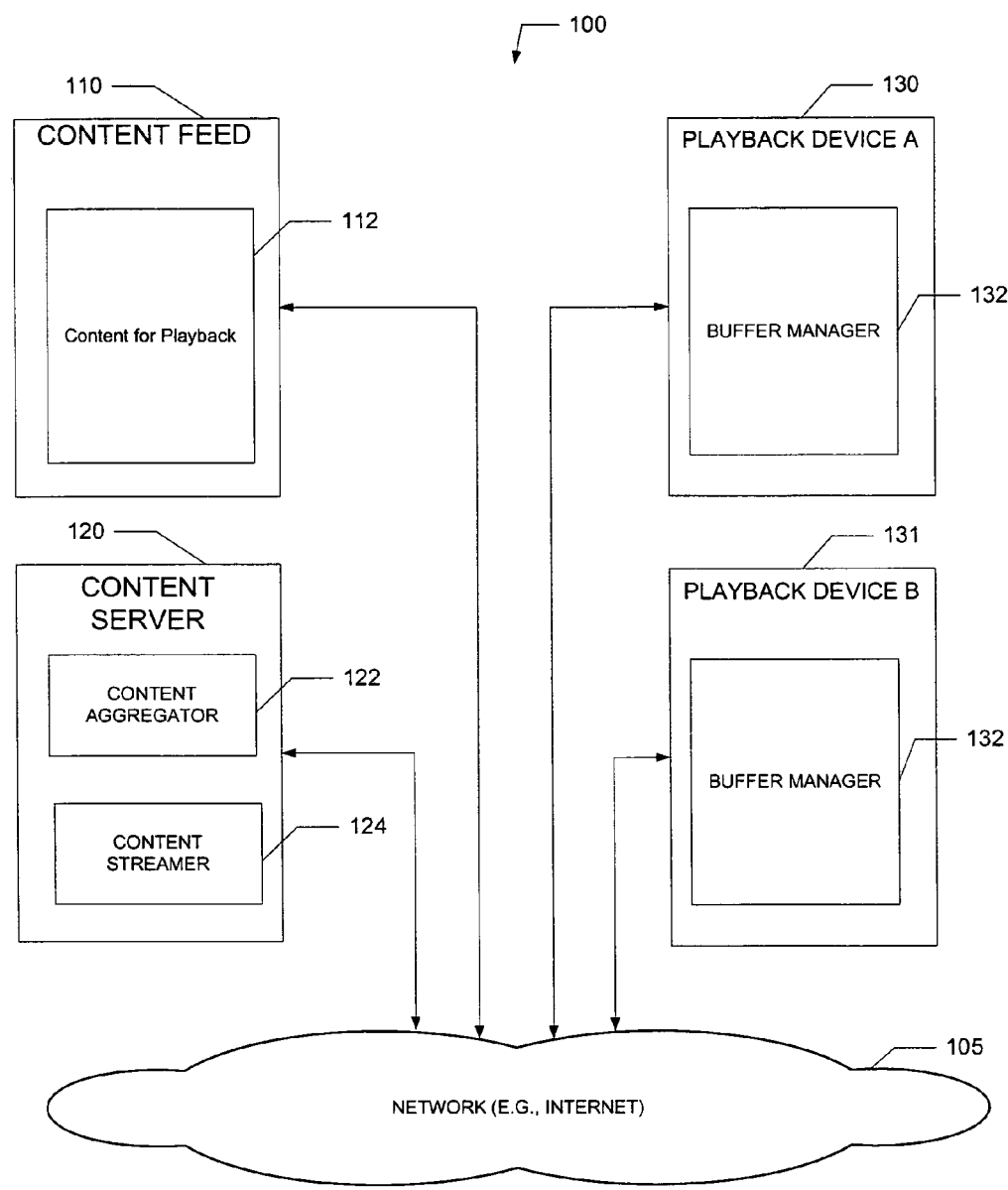
FIG. 1 illustrates an example embodiment of a networked system in which various embodiments may operate.

The real-time streaming buffer management process and system of the various embodiments described herein enable playback devices to receive a constant rate feed of content from network-based content sources. As described herein, a content server can be considered a network-accessible server, server farm, web site, or the like that can enable network access to and from client systems with playback devices via a network (e.g. the Internet). FIG. 1 illustrates an example embodiment of a networked system in which various embodiments may operate. As shown in FIG. 1, a content server 120 is in data communication with one or more playback devices 130 and 131 via a conventional network 105, such as the Internet. Playback devices 130 and 131 can be used by individuals who can log in to the content server 120 via the network 105 and become subscribers or members of the real-time streaming service enabled by the various embodiments described herein. In a particular embodiment shown in FIG. 1, a buffer manager 132 can be provided in or by playback devices 130 and 131. As described in more detail below, the buffer manager 132 controls the flow of content into and out of a playback device content buffer. In the example embodiment shown, content server 120 includes a content aggregator 122 and a content streamer 124. Content aggregator 122 includes processing logic to communicate with one or more content feeds 110 to coordinate the streaming of a user-selected item of content directly from the one or more content feeds 110 to the user playback device via network 105. Content feeds 110 can be sources or repositories of digital content 112 that can be streamed to a particular playback device via network 105. Content 112 can be any of various forms of digital content including video or multimedia (e.g., MPEG), still images (e.g., JPEG or TIFF), audio (e.g., MP3), spoken audio, digital documents, executable code, and the like. Content feeds 110 can represent websites, servers, peer-to-peer nodes, and the like. Content aggregator 122 can also include functionality to query a content feed 110 for a list of available content. These content lists from various content feeds 110 can be posted on content server 120 for viewing, searching, and selection by users of playback devices 130 and 131. The users of playback devices 130 and 131 can log in to accounts maintained on content server 120, search a list of available content, and select a particular item of content for streaming to the user's playback device via network 105. Content streamer 124 provides the processing logic to manage the streaming of the selected content to the playback device 130 or 131. As described in more detail below, the content streamer 124 operates in concert with the buffer manager 132 to control the rate and/or quality of the content stream as necessary to make sure the playback device 130 or 131 receives a constant rate feed of content from the network-based content feeds 110.

It will be apparent to those of ordinary skill in the art that an equivalent configuration could include multiple content server sites, each managing a portion of the functionality provided as described herein. A particular embodiment may include an additional layer, called the Partner Sites, wherein each Partner Site can be hosted on a separate server and each Partner Site can communicate with the buffer manager 132, described in more detail below. In this embodiment, each Partner Site can aggregate a subset of the available content from content feeds 110. Further, it will be apparent to those of ordinary skill in the art that another equivalent configuration could include a portion of the functionality provided by the buffer manager 132 being downloaded from the content server 120 to playback devices 130 and 131 and executed locally at the client sites. In any of these alternative configurations, the buffer manager 132 functionality provides and supports a system for enabling buffering for real-time data streaming as described in more detail below.

Figure 2:
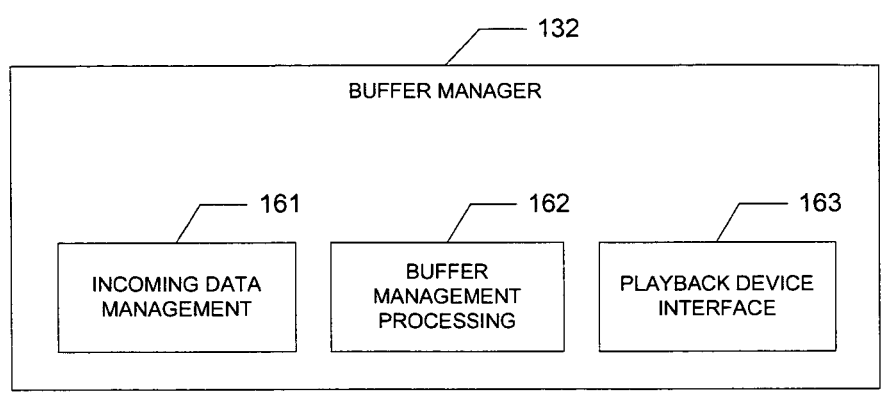
FIG. 2 illustrates an example embodiment showing the functional components of the buffer manager.

Description of the Real-Time Streaming and Buffer Management of an Example Embodiment Referring now to FIG. 2, an example embodiment showing the functional components of the buffer manager 132 is shown. As illustrated in FIG. 1 as described above, a content server 120 is in networked data communication with one or more playback devices 130 and 131 via a conventional network 105, such as the Internet. As such, the content server 120 can receive access and content requests from a plurality of users of playback devices 130 and 131. The playback devices 130 and 131 can provide a buffer manager component 132 to support the receipt of streamed content from the content server 120. The functionality provided by the buffer manager 132 of a particular embodiment to support users can be partitioned into a set of functional components 161-163. It will be understood that these functional components can be implemented in software executing on the playback devices 130 and 131. As described above, other equivalent configurations can also be implemented.

In a first functional component, an incoming data management component 161 is provided as part of buffer manager 132. The incoming data management component 161 provides the functionality for interfacing with content streamer 124 of content server 120 via network 105. The incoming data management component 161 can discover an available bandwidth (e.g., data rate or capacity) supported for streaming a particular item of content from a content feed 110 to the playback device 130 and/or 131 via network 105. Conventional ping and traceroute functions can be used to accomplish bandwidth discovery in a particular embodiment. The incoming data management component 161 can also negotiate with the content server 120 for a content quality type compatible with the particular item of content, compatible with user selections, and compatible with the available bandwidth for the streaming operation. Once the available bandwidth and content quality type for streaming a particular item of content are determined, the incoming data management component 161 can compute and set an initial incoming data speed (Si), an initial playback speed (Sp), and an initial buffer size (B) needed to ensure uninterrupted playback of the selected item of content on the playback device 130 and/or 131. In a particular embodiment, the initial buffer size (B) can be calculated from the difference between Sp and Si and the length of the content item being streamed. Typically, the initial buffer size (B) is allocated at the beginning of a streaming operation and remains constant, while Si and Sp are variables that can be changed during the streaming operation. The incoming data management component 161 can also compute and set an initial content buffer high and low watermark to track the capacity level of the buffer currently consumed by the streamed and un-played content. In the case of a very long content item, the buffer manager 132 may not be able to fill in the whole buffer before playback is started; because, loading the buffer may take too long. The criterion for starting to play the content item is when the buffer is filled to (or over) the high watermark. The use of the high and low watermarks is described in more detail below. Once the incoming data management component 161 determines or computes the various parameters described above, the incoming data management component 161 can signal the content server 120 to begin streaming the selected item of content. As described in more detail below, the incoming data management component 161 can also negotiate with the content server 120, after the streaming operation has started, for a different content quality type compatible with the speed at which the particular playback device 130 and/or 131 is able to consume the content stream.

In a second functional component of buffer manager 132, a buffer management processing component 162 is provided as part of buffer manager 132. The buffer management processing component 162 of an example embodiment provides the functionality for filling the content buffer and for detecting when the content has reached the high and low watermarks of the content buffer. The use of the high and low watermarks is described in more detail below. The buffer management processing component 162 of an example embodiment also provides the functionality for transferring the content from the content buffer to the playback device interface 163 for playback to the user of playback device 130 and/or 131.

In a third functional component, a playback device interface component 163 is provided as part of buffer manager 132. The playback device interface component 163 of an example embodiment provides the functionality for receiving content from the buffer management processing component 162 and for processing the content for playback to the user of playback device 130 and/or 131.

Figure 3:
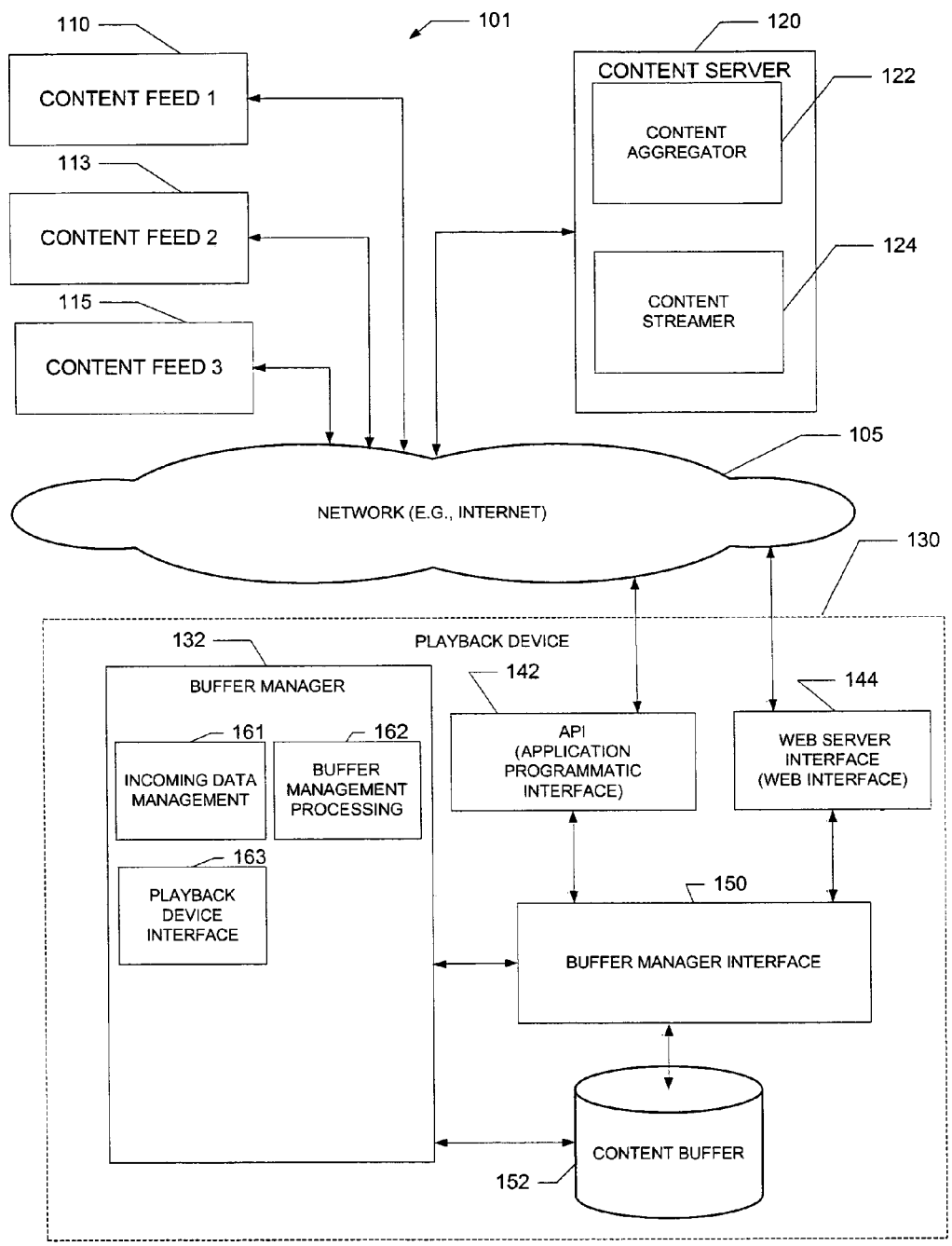
FIG. 3 illustrates another example embodiment of a networked system in which various embodiments may operate.

FIG. 3 illustrates another example embodiment of a networked system in which various embodiments may operate. As shown for an example embodiment, buffer manager 132 can be a component of a playback device 130. Buffer manager 132 can use a buffer manager interface 150 to send and receive data to/from content server 120 via network 105. In a particular embodiment, buffer manager interface 150 can send and receive data to/from content server 120 via a web server interface 144 or an application programmatic interface (API) 142. Buffer manager interface 150 can also be used to receive content from content feeds 110, 113, and/or 115 via a web server interface 144 or an application programmatic interface 142. As described above, the content aggregator 122 of the content server 120 includes processing logic to communicate with one or more content feeds 110, 113, and/or 115 and, in concert with content streamer 124, to coordinate the streaming of a user-selected item of content directly from the content feeds 110, 113, and/or 115 to the user playback device 130 via network 105. This content stream from a content feed 110, 113, and/or 115 can be received by the buffer manager interface 150 and stored in the content buffer 152 under control of the incoming data management component 161 and the buffer management processing component 162.

Figure 4:
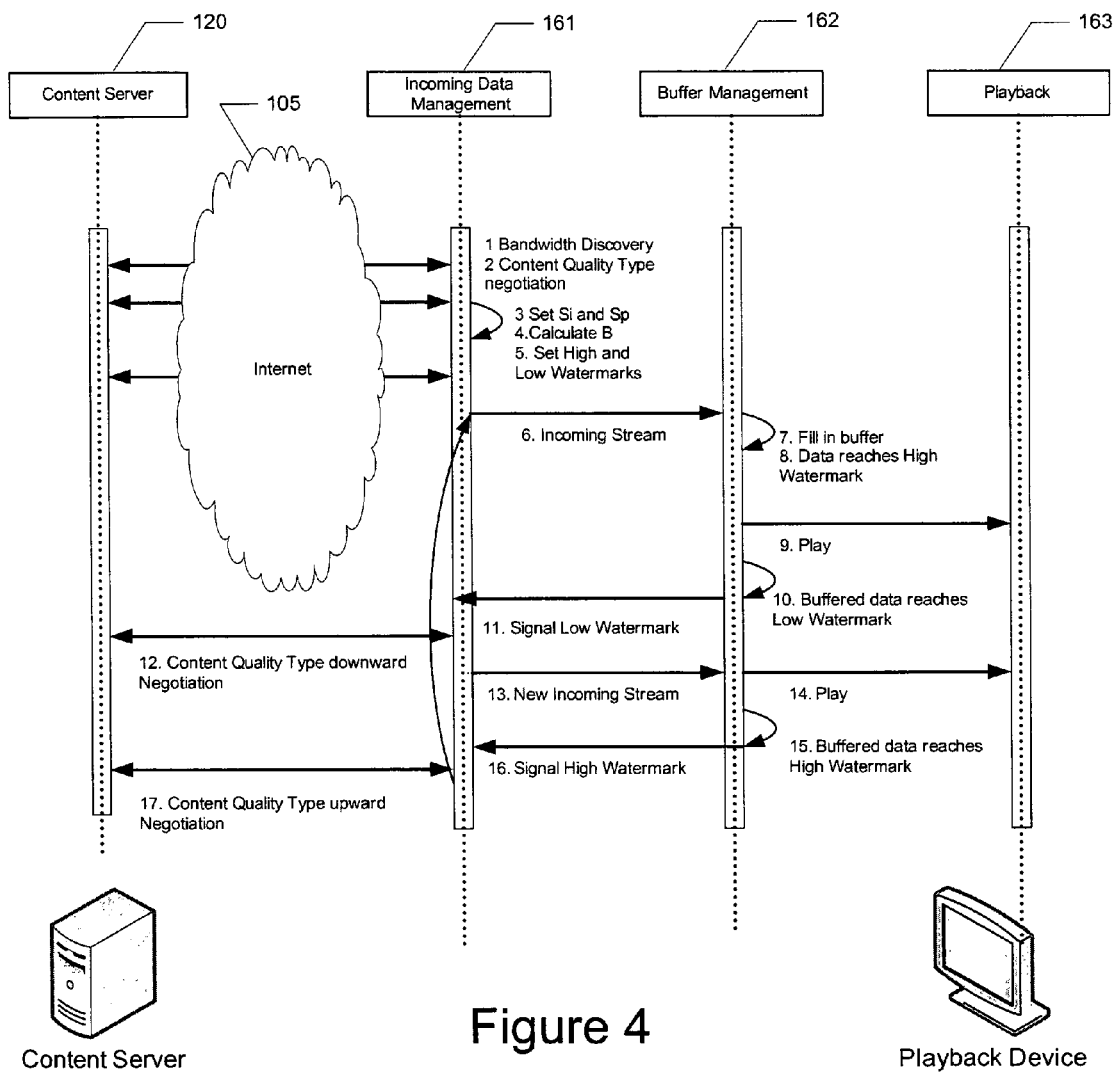
FIG. 4 is a sequence diagram illustrating a sequence of operations in a first example embodiment.

FIG. 4 is a sequence diagram illustrating a sequence of operations in a first example embodiment, wherein the buffer manager 132 uses a playback data reduction method to regulate the flow of content into and out of the content buffer 152. The example sequence of operations shown includes data interactions between a content server 120, a content feed 110 (not shown), and an incoming data management component 161, a buffer management processing component 162, and a playback device interface component 163 of buffer manager 132 on a playback device 130. In the example shown, in a first operation, the incoming data management component 161 can discover an available bandwidth (e.g., data rate or capacity) supported for streaming a particular item of content from a content feed 110 to the playback device 130 via network 105. In a second operation, the incoming data management component 161 can negotiate with the content server 120 for a content quality type compatible with the particular item of content, compatible with user selections, and compatible with the available bandwidth for the streaming operation. The various content quality types can include content encoding identifiers, pixel densities, audio or video type, data rate specifications, and the like. In a third and fourth operation, once the available bandwidth and content quality type for streaming a particular item of content are determined, the incoming data management component 161 can compute and configure an initial incoming data speed (Si), an initial playback speed (Sp), and an initial buffer size (B) needed to ensure uninterrupted playback of the selected item of content on the playback device 130. In a fifth operation, the incoming data management component 161 can also compute and configure an initial buffer high and low watermark to track the capacity level of the content buffer 152 currently consumed by the streamed and un-played content. In a sixth operation, once the incoming data management component 161 determines or computes the various parameters described above, the incoming data management component 161 can signal the content server 120 to begin streaming the selected item of content. In a separate series of operations (not shown), content server 120 can communicate with a content feed 110, 113, or 115 that can source the selected item of content. The content server 120 can initialize the content feed 110, 113, or 115 with the content quality type and speed parameters (e.g., Si) generated as described above. The content server 120 can also initialize the content feed 110, 113, or 115 with the network address of the particular playback device 130 that requested the particular item of content. The content server 120 can also direct the content feed 110, 113, or 115 to begin streaming the selected item of content to the particular playback device 130. As shown in FIG. 4, the content stream from the content feed 110, 113, or 115 is received by the incoming data management component 161 of buffer manager 132 and passed to the buffer management processing component 162.

In a seventh and eighth operation as shown for an example embodiment in FIG. 4, the buffer management processing component 162 receives the content stream from the incoming data management component 161 and begins to fill the content buffer 152 with the received content stream. This content fill process continues until a location in the content buffer 152 indicated by the high watermark is reached. As described herein, the high watermark and low watermark conditions should be met for certain pre-determined amount of time (denoted as the integration time or hysteresis) before triggering any subsequent action. This integration time will prevent false alarms and conditions where subsequent actions are triggered too often and too quickly. Once the high watermark is reached and the integration time is satisfied, the playback device 130 can begin to play the received content. In a ninth operation, the buffer management processing component 162 enables the playback device interface component 163 to play the content from the content buffer 152 for the user of playback device 130. As the content is played by or through the playback device interface component 163, the content buffer 152 begins to empty, if the content is not filling the content buffer 152 as fast as the content is being played. In a tenth operation, if the content buffer 152 begins to empty, the buffered content being played will eventually reach a location in the content buffer 152 indicated by the low watermark. In operation eleven, when the buffered content being played reaches the low watermark, the buffer management processing component 162 signals a low watermark condition to the incoming data management component 161. In operation twelve, when the low watermark condition is received by the incoming data management component 161, the incoming data management component 161 can negotiate with the content server 120, after the streaming operation has started, for a different content quality type compatible with the speed at which the particular playback device 130 is able to consume the content stream. In this case because of the low watermark condition detected, the incoming data management component 161 can negotiate with the content server 120 for a lower quality content type associated with a content stream that needs less bandwidth. Assuming a lower quality content type is available for the particular content item for which streaming is in progress, the content server 120 can signal the corresponding content feed 110, 113, or 115 to continue streaming the selected content item to the playback device 130 at the lower quality content type. In operation thirteen, the content stream from the content feed 110, 113, or 115 is received by the incoming data management component 161 of buffer manager 132 at a lower quality content type and passed to the buffer management processing component 162. In operation fourteen, the buffer management processing component 162 enables the playback device interface component 163 to continue playing the content (now a lower quality of content) from the content buffer 152 for the user of playback device 130. In a typical case, because of the lower bandwidth requirements, the lower quality content stream begins to fill the content buffer 152 faster than the buffered content can be played. Thus, in operation fifteen, as the content buffer 152 begins to fill up, the buffered content being filled will eventually reach a location in the content buffer 152 indicated by the high watermark. In operation fifteen, when the content being buffered reaches the high watermark, the buffer management processing component 162 signals a high watermark condition to the incoming data management component 161. In operation sixteen, when the high watermark condition is received by the incoming data management component 161, the incoming data management component 161 can negotiate with the content server 120, after the streaming operation has started, for a different content quality type compatible with the speed at which the particular playback device 130 is able to consume the content stream. In this case because of the high watermark condition detected, the incoming data management component 161 can negotiate with the content server 120 for a higher quality content type associated with a content stream that needs more bandwidth. Assuming a higher quality content type is available for the particular content item for which streaming is in progress, the content server 120 can signal the corresponding content feed 110, 113, or 115 to continue streaming the selected content item to the playback device 130 at the higher quality content type. In operation seventeen, the content stream from the content feed 110, 113, or 115 is received by the incoming data management component 161 of buffer manager 132 at a higher quality content type and passed to the buffer management processing component 162. The process can continue as described above. As the content streaming process continues, the detection of the low watermark condition as described above can cause the buffer manager 132 to negotiate with the content server 120 to reduce the quality of the content stream and thereby reduce the bandwidth requirements for streaming the content to the playback device. Conversely, the detection of the high watermark condition as described above can cause the buffer manager 132 to negotiate with the content server 120 to increase the quality of the content stream and thereby increase the bandwidth requirements for streaming the content to the playback device. As shown in FIG. 4 and described above, the modification of the quality of the content stream can occur as necessary while the content streaming is in progress to ensure that the playback devices can receive a constant rate feed of content from network-based content sources.

In summary as detailed above, a sequence of operations in a first example embodiment, wherein the buffer manager 132 uses a playback data reduction method to regulate the flow of content into and out of the content buffer 152, the example sequence of operations includes:

At startup—
  Do Bandwidth discovery using ping and traceroute;
At content selection—
  Choose the stream for which Sp is closest to the average Sp;
During playback—
  In case of Low Watermark for the Th seconds, trigger Low Watermark signal;
  In order to reduce false alarms, we introduce integration time or Hysteresis, Th.
  Th is the amount of time needed to validate a condition—in other words, to trigger an event such as an event occurring after a Low Watermark, the Low Watermark condition has to be present uninterrupted for Th seconds.
  Renegotiate stream downwards to reduce Sp.

Figure 5:
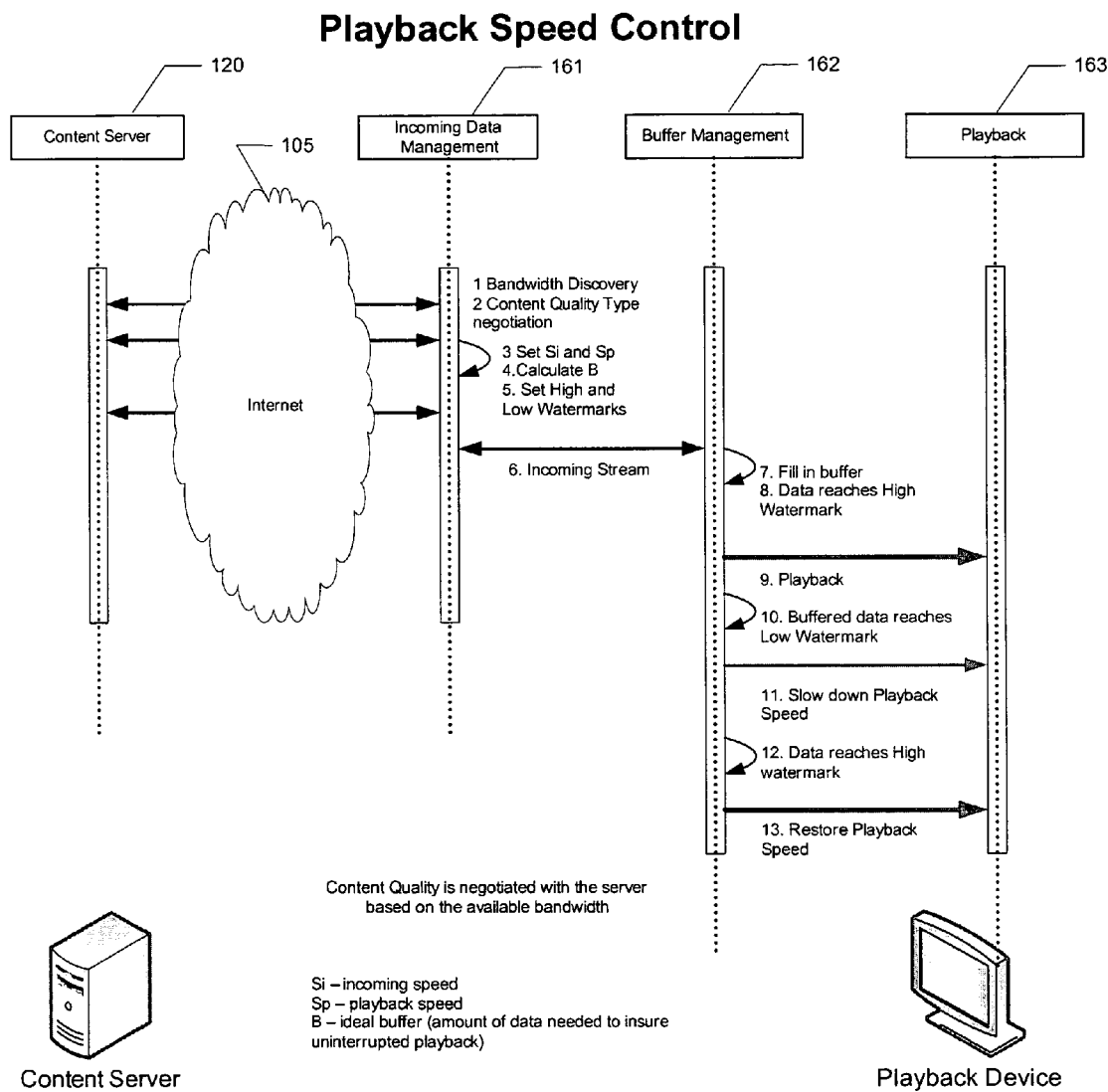
FIG. 5 is a sequence diagram illustrating a sequence of operations in a second example embodiment.

FIG. 5 is a sequence diagram illustrating a sequence of operations in a second example embodiment, wherein the buffer manager 132 uses a playback speed control method to regulate the flow of content into and out of the content buffer 152. The example sequence of operations shown includes data interactions between a content server 120, a content feed 110 (not shown), and an incoming data management component 161, a buffer management processing component 162, and a playback device interface component 163 of buffer manager 132 on a playback device 130. In the example shown, in a first operation, the incoming data management component 161 can discover an available bandwidth (e.g., data rate or capacity) supported for streaming a particular item of content from content server 120 to the playback device 130 via network 105. In a second operation, the incoming data management component 161 can negotiate with the content server 120 for a content quality type compatible with the particular item of content, compatible with user selections, and compatible with the available bandwidth for the streaming operation. The various content quality types can include content encoding identifiers, pixel densities, audio or video type, data rate specifications, and the like. In a third and fourth operation, once the available bandwidth and content quality type for streaming a particular item of content are determined, the incoming data management component 161 can compute and set an initial incoming data speed (Si), an initial playback speed (Sp), and an initial buffer size (B) needed to ensure uninterrupted playback of the selected item of content on the playback device 130. In a fifth operation, the incoming data management component 161 can also compute and set an initial buffer high and low watermark to track the capacity level of the content buffer 152 currently consumed by the streamed and un-played content. In a sixth operation, once the incoming data management component 161 determines or computes the various parameters described above, the incoming data management component 161 can signal the content server 120 to begin streaming the selected item of content. In a separate series of operations (not shown), content server 120 can communicate with a content feed 110, 113, or 115 that can source the selected item of content. The content server 120 can initialize the content feed 110, 113, or 115 with the content quality type and speed parameters (e.g., Si) generated as described above. The content server 120 can also initialize the content feed 110, 113, or 115 with the network address of the particular playback device 130 that requested the particular item of content. The content server 120 can also direct the content feed 110, 113, or 115 to begin streaming the selected item of content to the particular playback device 130. As shown in FIG. 5, the content stream from the content feed 110, 113, or 115 is received by the incoming data management component 161 of buffer manager 132 and passed to the buffer management processing component 162.

In a seventh and eighth operation as shown for an example embodiment in FIG. 5, the buffer management processing component 162 receives the content stream from the incoming data management component 161 and begins to fill the content buffer 152 with the received content stream. This content fill process continues until a location in the content buffer 152 indicated by the high watermark is reached. At this point, the playback device 130 can begin to play the received content. In a ninth operation, the buffer management processing component 162 enables the playback device interface component 163 to play the content from the content buffer 152 for the user of playback device 130. As the content is played by or through the playback device interface component 163, the content buffer 152 begins to empty, if the content is not filling the content buffer 152 as fast as the content is being played. In a tenth operation, if the content buffer 152 begins to empty, the buffered content being played will eventually reach a location in the content buffer 152 indicated by the low watermark. In operation eleven, when the buffered content being played reaches the low watermark, the buffer management processing component 162 commands the playback device interface component 163 to slow down the playback speed of the playback of the buffered content. In a typical case, because of the slower playback speed, the content stream begins to fill the content buffer 152 faster than the buffered content can be played. In operation eleven, the buffer management processing component 162 enables the playback device interface component 163 to continue playing the content from the content buffer 152 at a slower playback speed for the user of playback device 130. Thus, in operation twelve, as the content buffer 152 begins to fill up, the buffered content being filled will eventually reach a location in the content buffer 152 indicated by the high watermark. In operation thirteen, when the content being buffered reaches the high watermark, the buffer management processing component 162 commands the playback device interface component 163 to increase the playback speed (or restore an initial speed) of the playback of the buffered content. The process can then continue as described above. As the content streaming process continues, the detection of the low watermark condition as described above can cause the buffer manager 132 to slow down the playback speed of the content stream and thereby reduce the bandwidth requirements for streaming the content to the playback device. Conversely, the detection of the high watermark condition as described above can cause the buffer manager 132 to increase the playback speed of the content stream and thereby increase the bandwidth requirements for streaming the content to the playback device. As shown in FIG. 5 and described above, the modification of the speed of the content stream can occur as necessary while the content streaming is in progress to ensure that the playback devices can receive a constant rate feed of content from network-based content sources.

In summary as detailed above, a sequence of operations in a second example embodiment, wherein the buffer manager 132 uses a playback speed control method to regulate the flow of content into and out of the content buffer 152, the example sequence of operations includes processing as described below.

The Buffer Manager 132 should allocate an initial buffer. In order to ensure uninterrupted playback, the size of the initial buffer can be calculated using the following formula:

$$B=Tp*((Sp-Si)+C \qquad \text{<Formula F1>:}$$

Where:
B is the initial buffer length needed for uninterrupted playback in Kbits;
Tp is the playing time in seconds;
Sp is the initial playback speed Kbps;
Si is initial incoming data speed Kbps;
C is cushion data in Kbps.

For the cases that Si<Sp, the time to fill the buffer B in seconds is as follows:

$$Tb=B/Si=(Tp*(Sp-Si)+C)/Si \qquad \text{<Formula F2>:}$$

The cushion data C can be adjusted so that in the cases where Si=Sp and Si>Sp, the formula <Formula F1> doesn't produce a zero or negative result, respectively. Even in these cases, it is preferable to allocate the initial buffer for a certain amount of cushion data.

Introducing an integration time or Hysteresis, Th, can reduce false alarms. Th is the amount of seconds needed to average Si. This is the amount of time also to validate a condition before triggering an event.

To trigger a Low Watermark event, the Low Watermark condition has to be present uninterrupted for Th seconds. If the amount of buffered data exceeds the Low Watermark, a Low Watermark event counter is reset.

To trigger High Watermark event, the High Watermark condition has to be present uninterrupted for Th seconds. If the amount of buffered data drops under the High Watermark, a High Watermark event counter is reset.

The High Watermark event triggers:
1. The playback startup at the beginning of the content stream.
The following formula shows the delay before starting the playback:

$$D=Wh/Si \qquad \text{<Formula F3>:}$$

Where:
D is the delay in seconds before the playback begins;
Wh is the High Watermark data in Kbps;
2. The restoring of the quality of the content stream and/or
3. The restoring of the playback speed.

The Low Watermark event triggers:
1. The reducing of the quality of the content stream and/or
2. The reducing of the playback speed Sp.

In the case of a Low Watermark event, the playback speed is recalculated every Th seconds. The following formula shows the dependency between the Low Watermark data and the playback time in case we don't change the initial playback speed:

$$Wl=L*Sp \qquad \text{<Formula F4>:}$$

Where:
Wl is the Low Watermark data in Kbits;
L is the playback time for Low Watermark in seconds.

In order to increase the playback time we reduce the playback speed. The following formula determines the playback speed for the next Th seconds during Low Watermark condition:

$$Spn=(Spc*Bc)/Bp \qquad \text{<Formula F5>:}$$

Where:
Spn is the new playback speed for the next Th seconds;
Spc is the playback speed for the current Th seconds;
Bc is the amount of data currently available in Kbits;
Bp is the amount of data in Kbits previously available Th seconds prior.

Figure 6:
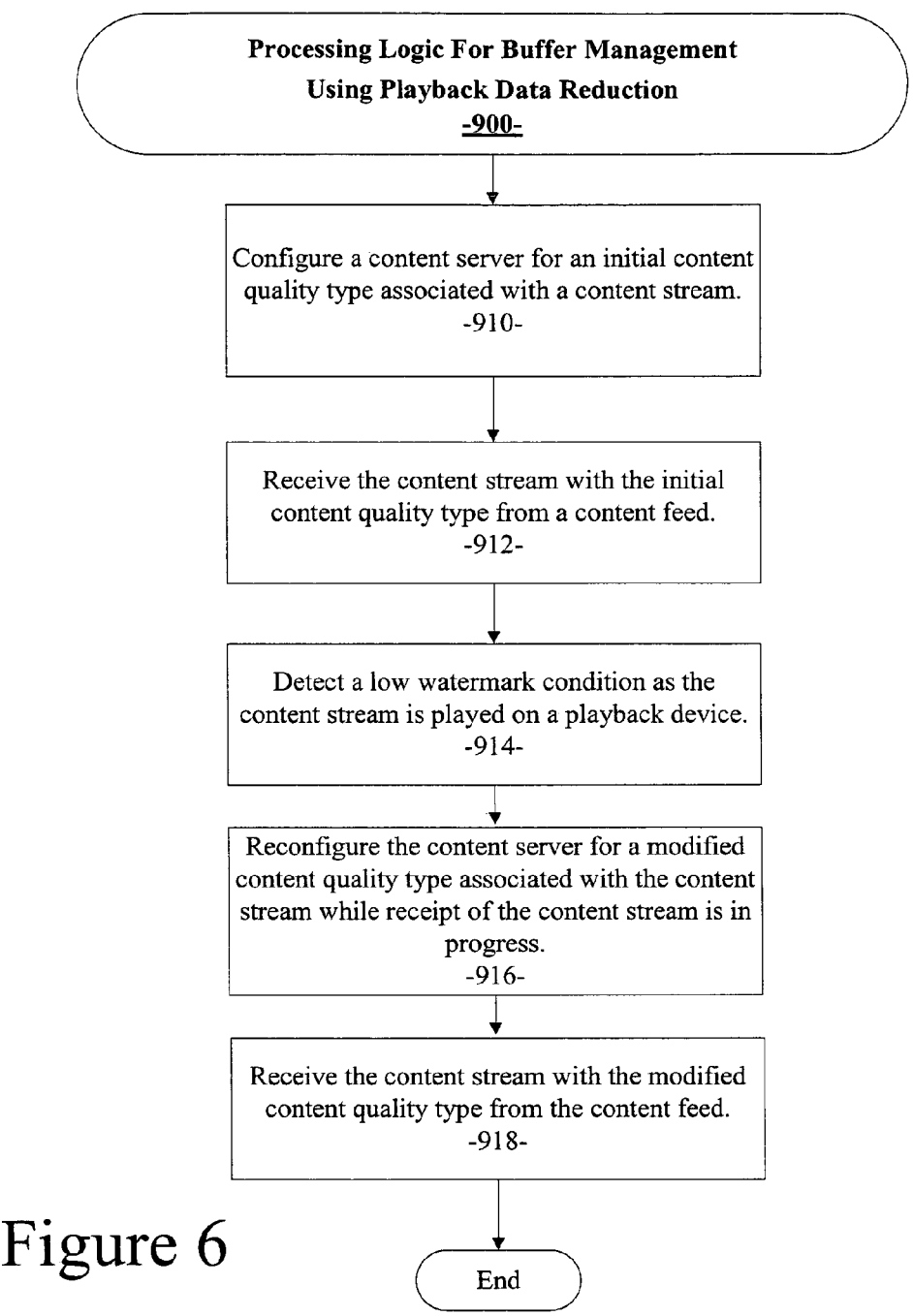
FIGS. 6 and 7 are processing flow diagrams illustrating a sequence of processing operations in various example embodiments.
Figure 7:
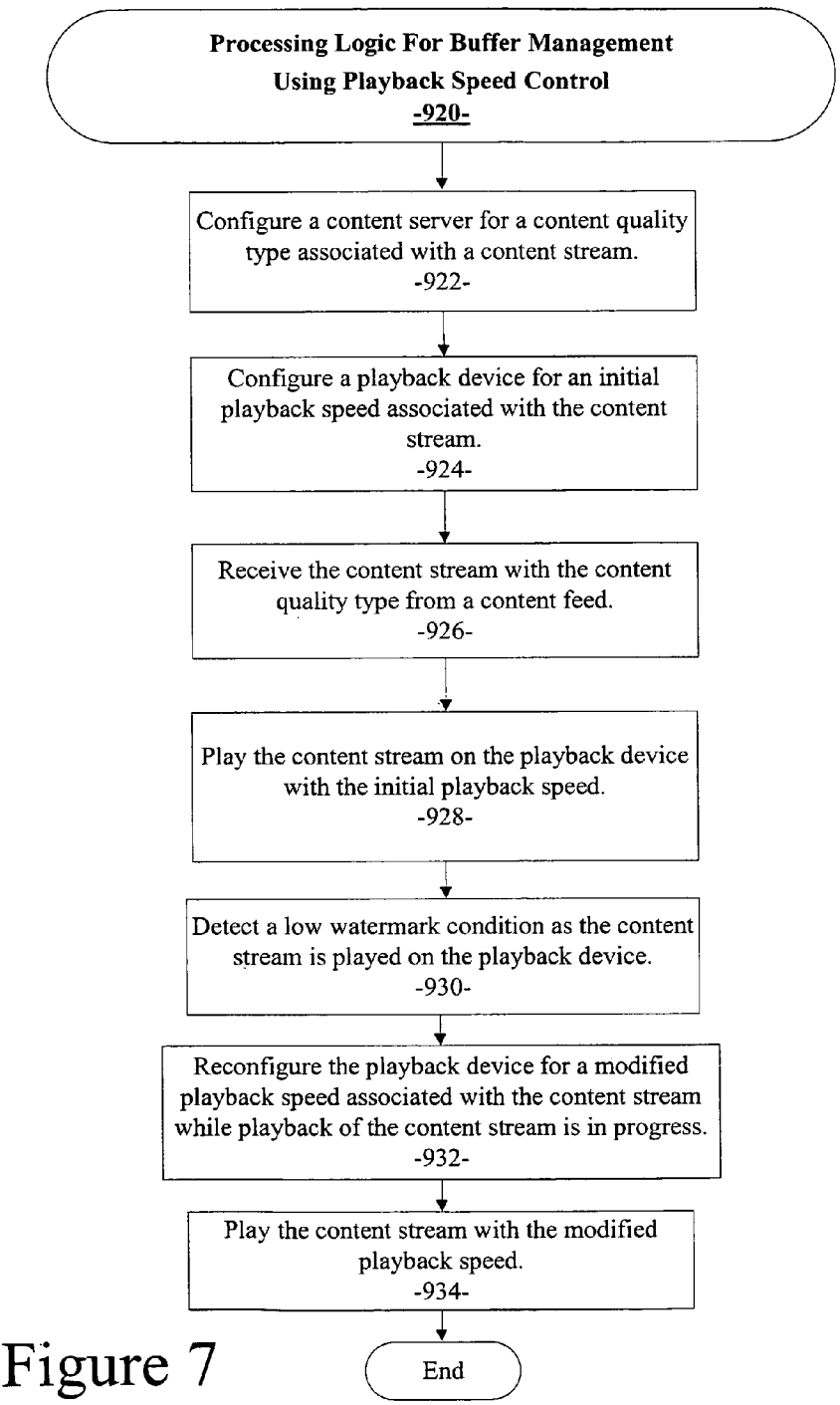

FIGS. 6 and 7 are processing flow diagrams illustrating a sequence of processing operations in an example embodiment. As shown in FIG. 6, processing operations performed by an example embodiment 900 include: configuring a content server for an initial content quality type associated with a content stream (processing block 910); receiving the content stream with the initial content quality type from a content feed (processing block 912); detecting a low watermark condition as the content stream is played on a playback device (processing block 914); reconfiguring the content server for a modified content quality type associated with the content stream while receipt of the content stream is in progress (processing block 916); and receiving the content stream with the modified content quality type from the content feed (processing block 918).

As shown in FIG. 7, processing operations performed by another example embodiment 920 include: configuring a content server for a content quality type associated with a content stream (processing block 922); configuring a playback device for an initial playback speed associated with the content stream (processing block 924); receiving the content stream with the content quality type from a content feed (processing block 926); playing the content stream on the playback device with the initial playback speed (processing block 928); detecting a low watermark condition as the content stream is played on the playback device (processing block 930); reconfiguring the playback device for a modified playback speed associated with the content stream while playback of the content stream is in progress (processing block 932); and playing the content stream with the modified playback speed (processing block 934).

Figure 8:
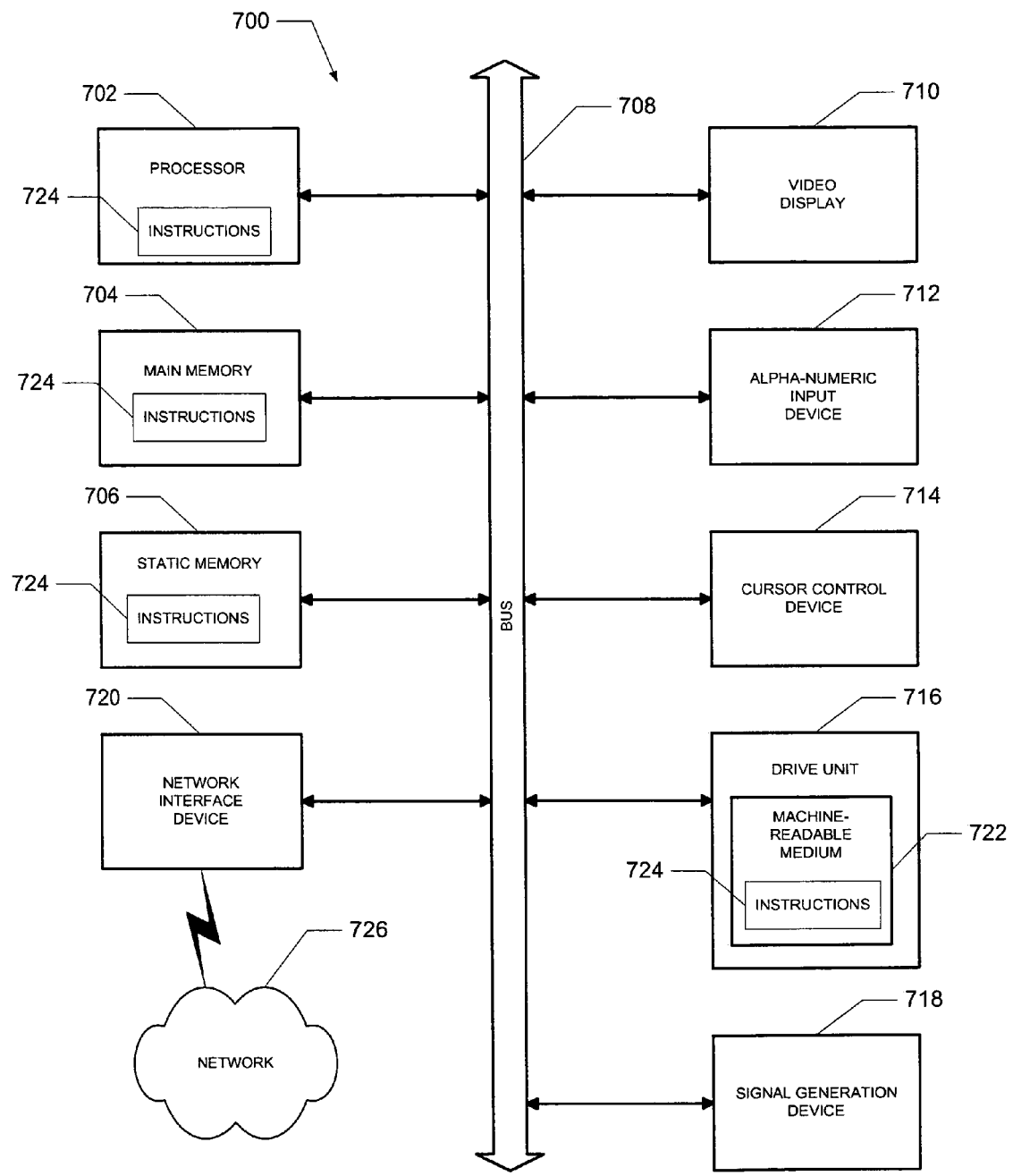
FIG. 8 shows a diagrammatic representation of a machine in the form of a computer system within which a set of instructions, for causing the machine to perform any one or more of the methodologies discussed herein, may be executed, according to an example embodiment.

FIG. 8 shows a diagrammatic representation of a machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in client-server network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, an audio or video player, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system (e.g., a standalone, client or server computer system) configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical and magnetic media, and carrier wave signals. As noted, the software may be transmitted over a network using a transmission medium. The term "transmission medium" shall be taken to include any medium that is capable of storing, encoding or carrying instructions for transmission to and execution by the machine, and includes digital or analog communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus, the following claims are hereby incorporated into the Detailed Description, with each claim standing on its own as a separate embodiment.

The system of an example embodiment may include software, information processing hardware, and various processing steps, which are described herein. The features and process steps of example embodiments may be embodied in articles of manufacture as machine or computer executable instructions. The instructions can be used to cause a general purpose or special purpose processor, which is programmed with the instructions to perform the steps of an example embodiment. Alternatively, the features or steps may be performed by specific hardware components that contain hard-wired logic for performing the steps, or by any combination of programmed computer components and custom hardware components. While embodiments are described with reference to the Internet, the method and apparatus described herein is equally applicable to other network infrastructures or other data communications systems.

Various embodiments are described herein. In particular, the use of embodiments with various types and formats of user interface presentations and/or application programming interfaces may be described. It can be apparent to those of ordinary skill in the art that alternative embodiments of the implementations described herein can be employed and still fall within the scope of the claimed invention. In the detail herein, various embodiments are described as implemented in computer-implemented processing logic denoted sometimes herein as the "Software". As described above, however, the claimed invention is not limited to a purely software implementation.

Thus, a computer-implemented system and methods for buffering of real-time data streams are disclosed. While the present invention has been described in terms of several example embodiments, those of ordinary skill in the art can recognize that the present invention is not limited to the embodiments described, but can be practiced with modification and alteration within the spirit and scope of the appended claims. The description herein is thus to be regarded as illustrative instead of limiting.

What is claimed is:

1. A computer-implemented method comprising:
    transmitting a request, at a user device, to a content server for an initial content quality type associated with a content stream, the initial content quality type corresponding to an initial speed at which the user device is able to consume the content stream;
    receiving, at the user device, the content stream with the initial content quality type directly from a content feed, the content stream not being stored at the content server, the content feed being located at a site different from the content server;
    detecting, at the user device, a low watermark condition as the content stream is played on the user device;
    discovering, at the user device, an available bandwidth associated with the content feed;
    transmitting a request, at the user device, to the content server, based on the discovered available bandwidth of the content feed, for a modified content quality type associated with the content stream while receipt of the content stream is in progress; and
    receiving, at the user device, the content stream with the modified content quality type from the content feed, the modified content quality type corresponding to a different speed at which the user device is able to consume the content stream.

2. The computer-implemented method as claimed in claim 1 including detecting a high watermark condition as the content stream is played on the user device; and requesting the content server for the initial content quality type associated with the content stream while streaming of the content stream is in progress.

3. The computer-implemented method as claimed in claim 1 including negotiating with the content server for a content quality type compatible with the content stream and compatible with the available bandwidth associated with the content feed.

4. The computer-implemented method as claimed in claim 1 including configuring an initial incoming data speed (Si), an initial playback speed (Sp), an initial buffer size (B), and initial high and low watermarks.

5. The computer-implemented method as claimed in claim 1 including filling a content buffer with the content stream to a location indicated by a high watermark.

6. An apparatus comprising:
    a user device; and
    a buffer manager, at the user device, the buffer manager being configured to:
    transmit a request to a content server for an initial content quality type associated with a content stream, the initial content quality type corresponding to an initial speed at which the user device is able to consume the content stream;
    receive the content stream with the initial content quality type directly from a content feed, the content stream not being stored at the content server, the content feed being located at a site different from the content server;
    detect a low watermark condition as the content stream is played on the user device;
    discover an available bandwidth associated with the content feed;
    transmit a request to the content server, based on the discovered available bandwidth of the content feed, for a modified content quality type associated with the content stream while receipt of the content stream is in progress; and
    receive the content stream with the modified content quality type from the content feed, the modified content quality type corresponding to a different speed at which the user device is able to consume the content stream.

7. The apparatus as claimed in claim 6 being further configured to detect a high watermark condition as the content stream is played on the user device; and reconfigure the content server for the initial content quality type associated with the content stream while streaming of the content stream is in progress.

8. The apparatus as claimed in claim 6 being further configured to negotiate with the content server for a content quality type compatible with the content stream and compatible with the available bandwidth associated with the content feed.

9. The apparatus as claimed in claim 6 being further configured to configure an initial incoming data speed (Si), an initial playback speed (Sp), an initial buffer size (B), and initial high and low watermarks.

10. The apparatus as claimed in claim 6 being further configured to fill a content buffer with the content stream to a location indicated by a high watermark.

11. An article of manufacture comprising a non-transitory machine readable storage medium having machine executable instructions embedded thereon, which when executed by a user device, cause the user device machine to:
    transmit a request to a content server for an initial content quality type associated with a content stream, the initial content quality type corresponding to an initial speed at which the user device is able to consume the content stream;
    receive the content stream with the initial content quality type directly from a content feed, the content stream not being stored at the content server, the content feed being located at a site different from the content server;
    detect a low watermark condition as the content stream is played on the user device;

discover an available bandwidth associated with the content feed;
transmit a request to the content server, based on the discovered available bandwidth of the content feed, for a modified content quality type associated with the content stream while receipt of the content stream is in progress; and
receive the content stream with the modified content quality type from the content feed, the modified content quality type corresponding to a different speed at which the user device is able to consume the content stream.

* * * * *